(12) United States Patent
Van Hees et al.

(10) Patent No.: US 6,289,159 B1
(45) Date of Patent: Sep. 11, 2001

(54) OPTICAL FIBER DISTRIBUTION SYSTEM

(76) Inventors: Jan Van Hees, Knapzak 1, 3210 Linden, 620920; Michel Vanderlinden, Bierbeekstraat 25, 3052 Blanden; Mario Mathues, Merelhof 9, 3300 Tienen; Louis Van Noten, Oude Rondelaan 6, 3000 Leuven, all of (BE)

( * ) Notice: Subject to any disclaimer, the term of this patent is extended or adjusted under 35 U.S.C. 154(b) by 0 days.

(21) Appl. No.: 09/125,298
(22) PCT Filed: Feb. 13, 1997
(86) PCT No.: PCT/GB97/00394
   § 371 Date: Oct. 22, 1998
   § 102(e) Date: Oct. 22, 1998
(87) PCT Pub. No.: WO97/30370
   PCT Pub. Date: Aug. 21, 1997

(30) Foreign Application Priority Data

Feb. 14, 1996 (GB) .................................................. 9603017

(51) Int. Cl.[7] ........................................................ G02B 6/00
(52) U.S. Cl. ........................... 385/134; 385/53; 385/135
(58) Field of Search ............................... 385/53, 134, 135

(56) References Cited

U.S. PATENT DOCUMENTS

| Re. 34,955 | * | 5/1995 | Anton et al. ........................... 385/53 |
| 4,832,436 | | 5/1989 | Goto et al. ............................. 385/53 |
| 5,013,121 | | 5/1991 | Anton et al. ......................... 350/96.2 |
| 5,339,379 | | 8/1994 | Kutsch et al. ........................ 385/135 |
| 5,402,515 | | 3/1995 | Vidacovich et al. ................. 385/135 |
| 5,511,144 | * | 4/1996 | Hawkins et al. ..................... 385/135 |
| 5,778,131 | * | 7/1998 | Llewellyn et al. ................... 385/135 |

FOREIGN PATENT DOCUMENTS 2678076  12/1992  (FR) ............................... G02B/6/38

OTHER PUBLICATIONS

Patent Abstracts of Japan; Publication No. 58098714 published on Nov. 6, 1983 entitled "Optical Fiber Connector Base", Applicant: Furukawa Electric Co. Ltd.

* cited by examiner

Primary Examiner—Rodney Bovernick
Assistant Examiner—Ellen E. Kim
(74) Attorney, Agent, or Firm—Allen, Dyer, Doppelt, Milbrath & Gilchrist, P.A.

(57) ABSTRACT

An optical fibre distribution system, comprising:
 (a) at least one stack of optical fibre interconnection modules; and
 (b) at least one optical fibre storage region located in at least one said stack of interconnection modules, which storage region, in use, stores spare lengths of one or more optical fibres which extend between respective interconnection modules, wherein the or each storage region comprises a plurality of supports which are mutually spaced-apart across at least part of the width of the stack of interconnection modules such that, in use, each spare length of optical fibre may be routed into the storage region and routed around at least one of the supports which may be selected to provide at least approximately the correct storage length required for that spare length of optical fibre.

28 Claims, 3 Drawing Sheets

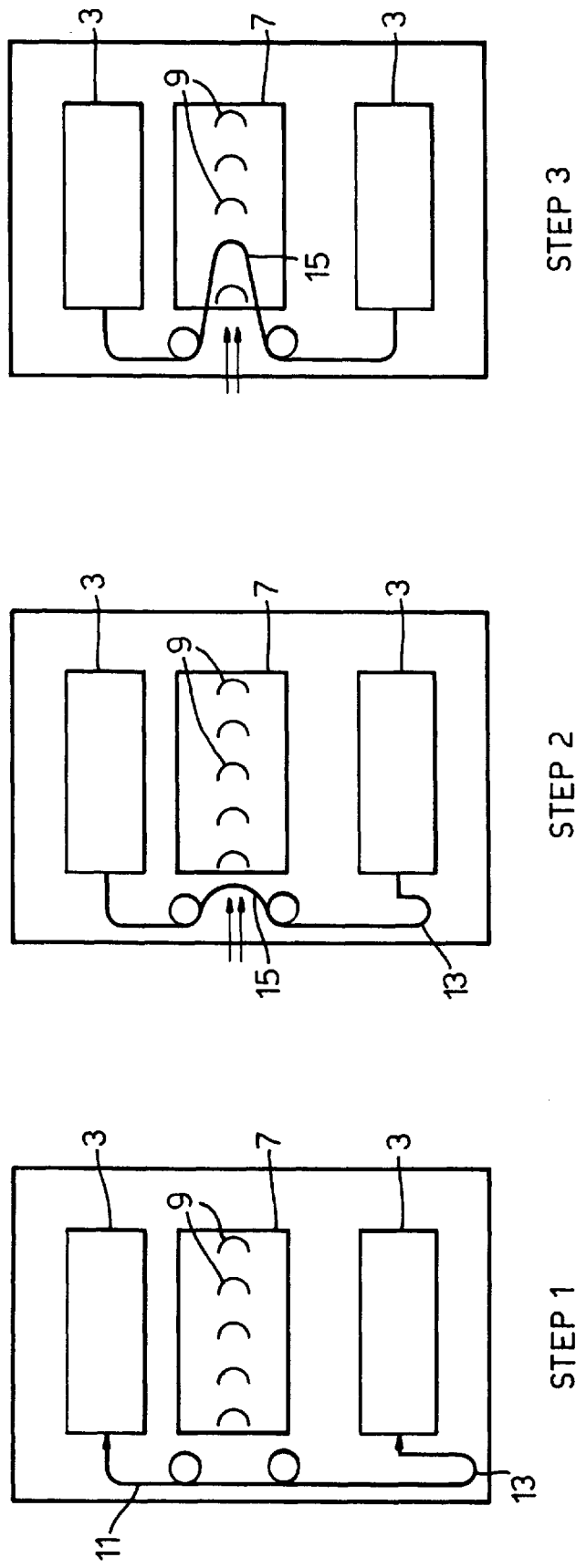

OPTICAL FIBER DISTRIBUTION SYSTEM

Figure 1:
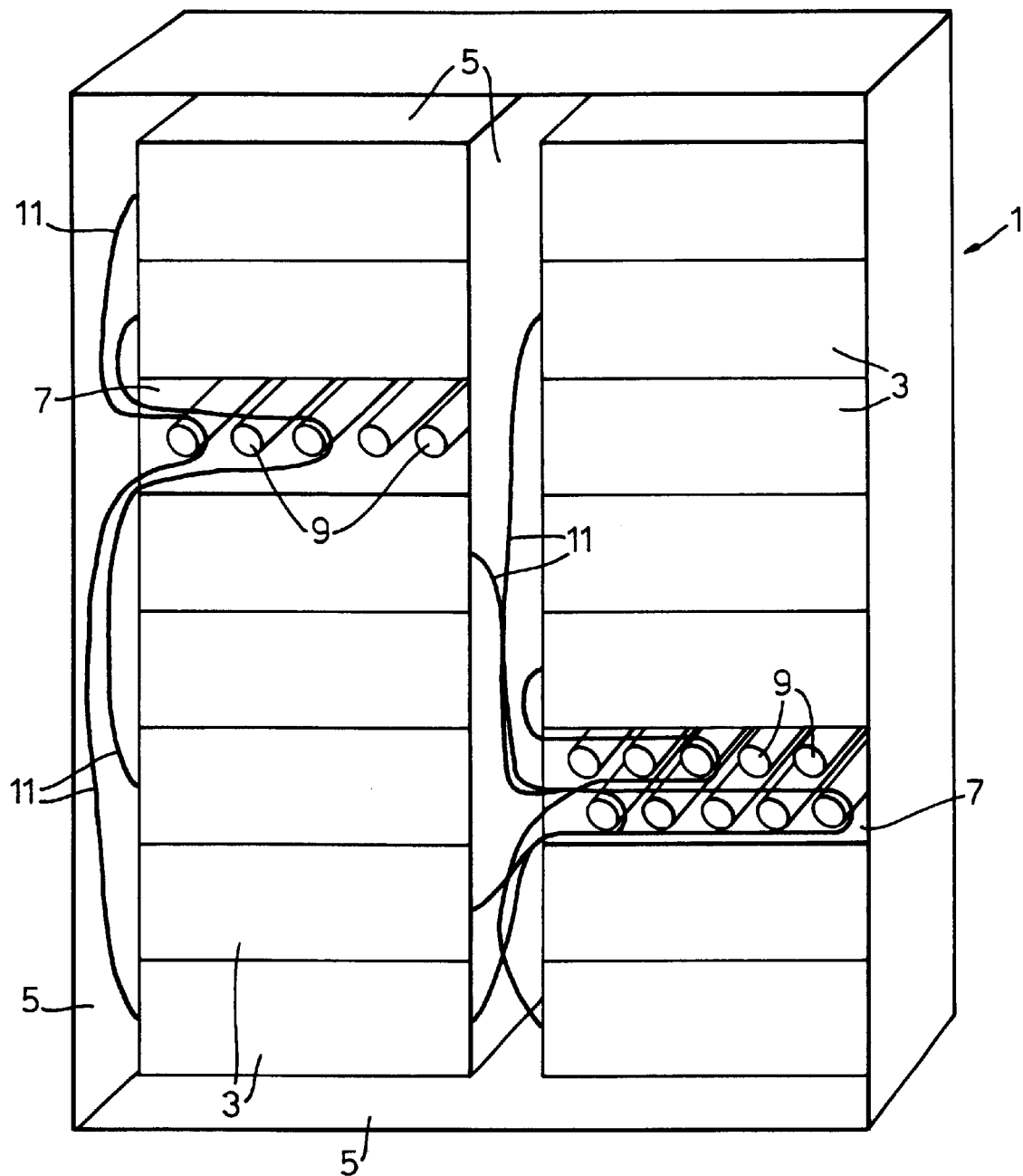

The present invention relates to an optical fibre distribution system, to a kit of parts for forming such a system, to an optical fibre storage region module for an optical fibre distribution system, and to a method of connecting an optical fibre and storing a spare length thereof in an optical fibre distribution system.

Several types of optical fibre distribution systems, which are commonly known as frames or racks, are used today. For example, one type of system is disclosed in U.S. Pat. No. 5,402,515 (3M). This patent discloses a system which comprises a frame having several bays for receiving connector modules, associated jumper organizers for storing spare lengths of jumpers (which may also be called pigtails or patch cords and comprise ruggedized optical fibres which are connected to the connector modules), and upper and lower troughs for conveying jumper fibres between adjacent bays. Spare lengths of jumpers are stored in vertical raceways between the bays of connector modules, with each vertical raceway containing several spools which support the jumpers in such a manner that there are never more than two continuous bends of more than 90°.

A different system of storing spare lengths (sometimes referred to as slack or excess) of optical fibres in a distribution system is disclosed in U.S. Pat. No. 5,013,121. In this system, the spare optical fibre lengths are stored in a cabinet or module which may form part of a stack of connector cabinets or modules in a distribution frame. The cabinet which stores the spare fibre contains a plurality of trays which are slidably received within the cabinet. A take up spool is provided on each tray, and the slack of a patch cord fibre is stored on each tray by winding the take up spool on that tray.

There are disadvantages with each of these systems. While the spare jumper length storage system disclosed in U.S. Pat. No. 5,402,515 has the advantage of simplicity, it has the disadvantage of providing only poor organization of the spare jumper lengths, and tangling of jumpers is therefore possible, and even likely. This tangling leads to the disturbance of other jumpers when attempting to access one particular jumper, which can cause losses in optical signal transmission. Furthermore, the tangling of jumpers is exacerbated by the fact that the vertical raceways (where the spare jumper lengths are stored) are also used to route jumpers between the bays of the distribution system, and so these raceways are normally very crowded with jumpers. This also makes the provision of wide vertical raceways between the bays a necessity, which is disadvantageous in situations where there is insufficient space available for such wide vertical raceways.

The system disclosed in U.S. Pat. No. 5,013,121 provides a much greater degree of organization of spare optical fibre lengths (e.g., spare jumper or patch cord lengths), but this improved organization is achieved at the cost of greatly increased installation complexity (and consequently installation time). Spare lengths of fibre must be stored individually on the trays in the cabinet in a time-consuming and laborious installation procedure, and a correspondingly time-consuming and laborious procedure is also required in order to gain access to the fibre once stored. Furthermore, the cabinet is a complex and intricate construction which can store a maximum of only 48 patch cords or jumpers, and it is thus a costly and space-consuming design despite its superficially compact appearance.

There is thus a need for an optical fibre distribution system in which spare lengths of fibre are stored in an organized yet compact manner, and which provides quick and easy installation and access of such stored fibre in a manner which reduces the risk of disturbance of other stored fibres. The purpose of the present invention is to provide such a system.

Accordingly, a first aspect of the present invention provides an optical fibre distribution system, comprising:
(a) at least one stack of optical fibre interconnection modules; and
(b) at least one optical fibre storage region located in at least one said stack of interconnection modules, which storage region, in use, stores spare lengths of one or more optical fibres which extend between respective interconnection modules, wherein the or each storage region comprises a plurality of supports which are mutually spaced-apart across at least part of the width of the stack of interconnection modules such that, in use, each spare length of optical fibre may be routed into the storage region and routed around at least one of the supports which may be selected to provide at least approximately the correct storage length required for that spare length of optical fibre.

A second aspect of the invention provides a kit of parts for forming an optical fibre distribution system, comprising:
(a) a plurality of optical fibre interconnection modules which, in use, are arranged in a stack; and
(b) at least one optical fibre storage region module which, in use, is located in at least one said stack of interconnection modules, which storage region, in use, stores spare lengths of one or more optical fibres which extend between respective interconnection modules, wherein the or each storage region comprises a plurality of supports which are mutually spaced-apart across at least part of the width of the stack of interconnection modules such that, in use, each spare length of optical fibre may be routed into the storage region and routed around at least one of the supports which may be selected to provide at least approximately the correct storage length required for that spare length of optical fibre.

A third aspect of the invention provides an optical fibre storage region module for an optical fibre distribution system, which module, in use, stores spare lengths of one or more optical fibres which are connected in the distribution system, the module comprising a plurality of supports which are mutually spaced-apart across at least part of the width thereof such that, in use, each spare length of optical fibres may be routed into the module and routed around at least one of the supports which may be selected to provide at least approximately the correct storage length required for that spare length of optical fibre.

A fourth aspect of the invention provides a method of connecting an optical fibre and storing a spare length thereof in an optical fibre distribution system according to the first aspect of the invention, comprising:
(a) connecting opposite ends of the optical fibre in respective interconnection modules;
(b) routing a said spare length of said connected optical fibre into the storage region;
(c) selecting at least one of the supports to provide at least approximately the correct storage length required for that spare length of optical fibre; and
(d) routing the spare length of optical fibres around the selected support(s).

Preferably, the step of routing the spare length of optical fibre around the selected support(s) comprises hooking a bend in that optical fibre around the selected support(s), e.g. by passing the bend around an end (e.g. a front end) of the support or through a gap in the support.

The invention has the advantage that is provides a simple, organized and compact system of storing spare lengths of optical fibre (which will normally be ruggedized fibre, e.g. pigtails, patch cords or jumpers) because the storage region comprises a plurality of supports which are mutually spaced-apart across at least part of the width of the stack of modules such that each spare length of optical fibre may be routed into the storage region and routed around at least one of the supports which may be selected to provide at least approximately the correct storage length for that spare length of optical fibre.

This manner of spare fibre length storage is compact because it does not require the use of trays for storing individual (ruggedized) fibres; also, because the storage is carried out within the stack of modules, it does not require wide vertical raceways between such stacks or bays. It furthermore provides good organization since the spare fibre lengths are organized according to their length by virtue of the fact that the support or supports around which they are routed is/are selected according to the length of spare fibre which needs to be accommodated. This means that the spare lengths of fibre routed into the storage region are each organized into one of a plurality of different possible routes, thus aiding subsequent accessibility. Ordinarily, of course, there will be more than one (ruggedized) fibre following each route. It has been found that this system of spare fibre length storage can provide adequately organized storage of up to 300 or more ruggedized fibres in the same volume and shape as the module disclosed in U.S. Pat. No. 5,013,121 (which typically has dimensions of: height 8" (20.3 cm); depth 12" (30.5 cm); width 21" (53.3 cm)).

The optical fibre storage region preferably comprises a module which may be included in a stack of interconnection modules (or the like) as and where required. Advantageously, the or each storage region module may have substantially the same size and shape as the, or at least one of the, interconnection modules. Alternatively, however, at least in some embodiments, the storage region may be a part of, or attachable to, a frame (or the like) of the distribution system, other than as a module. For example, the supports may be part of, or attachable directly to, such a frame.

The interconnection modules preferably includes means for connecting the optical fibres (spare lengths of which are stored in the storage region(s)) to other optical fibres and/or devices (e.g. optical devices). They may, for example, include optical connectors, splices, splitters or the like. They most preferably include a patch panel or other patching means.

The plurality of supports in the optical fibre storage region preferably comprise at least one series of supports (e.g. three or four or more) which are mutually spaced-apart across at least part of the region, i.e. across at least part of the module or stack of interconnection modules. Advantageously, each support may comprise at least one elongate member which extends in a direction which is transverse, and preferably substantially perpendicular, to the width of the stack of interconnection modules. Each support is preferably shaped so that the radius of curvature of an optical fibre routed around it in use cannot be less than the normal operational minimum bend radius of the fibre (in order to avoid damage of the fibre and/or optical transmission losses).

Preferably, spare lengths of optical fibre are routed into the optical fibre storage region through at least one side thereof (i.e. through at least one extreme end of its width). The fibres may, for example, be routed into the storage region from one side only, e.g. to avoid tangling of the stored lengths. Ordinarily, when the fibres enter the storage region from only one side, they may subsequently be removed without the need to remove any of the other stored fibres. Alternatively, optical fibres may be routed through the storage region from one side to the other across its width.

In some preferred embodiments of the invention, the or each optical fibre storage region has at least one support located at the point of entry/exit of an optical fibre into the storage region, the support being arranged so that an optical fibre entering/exiting the storage region may be routed around it.

In certain preferred embodiments, the supports (e.g. elongate support members) increase in length from one side to the other side of the stack of interconnection modules. This has the advantage that it may improve the ease of installation and/or removal of stored optical fibre lengths into or out of the storage region. The supports preferably decrease in length away from a side of the region from which the fibres enter the region (see, for example, FIG. 2 of the drawings).

The or each stack of interconnection modules preferably has a front and a back which are each transverse to its width (the stack is preferably substantially rectangular or square in plan view), for example with the front arranged to be readily accessible, and the back arranged to be less readily accessible, in use. The supports of the or each storage region are preferably mounted on a structural member of the distribution system located at or near the back of the stack of interconnection modules. In embodiments in which the or each storage region comprise(s) a module, the structural member preferably comprises part of the module, e.g. a back plate or frame of the module. Otherwise, the structural member may, for example, comprise a frame or the like) of the distribution system, e.g. upon which the interconnection modules are mounted. In preferred embodiments, the support members (e.g. elongate members) extend closer to the front of the stack of interconnection modules as their length increases from one side to the other side of the stack.

Figure 2:
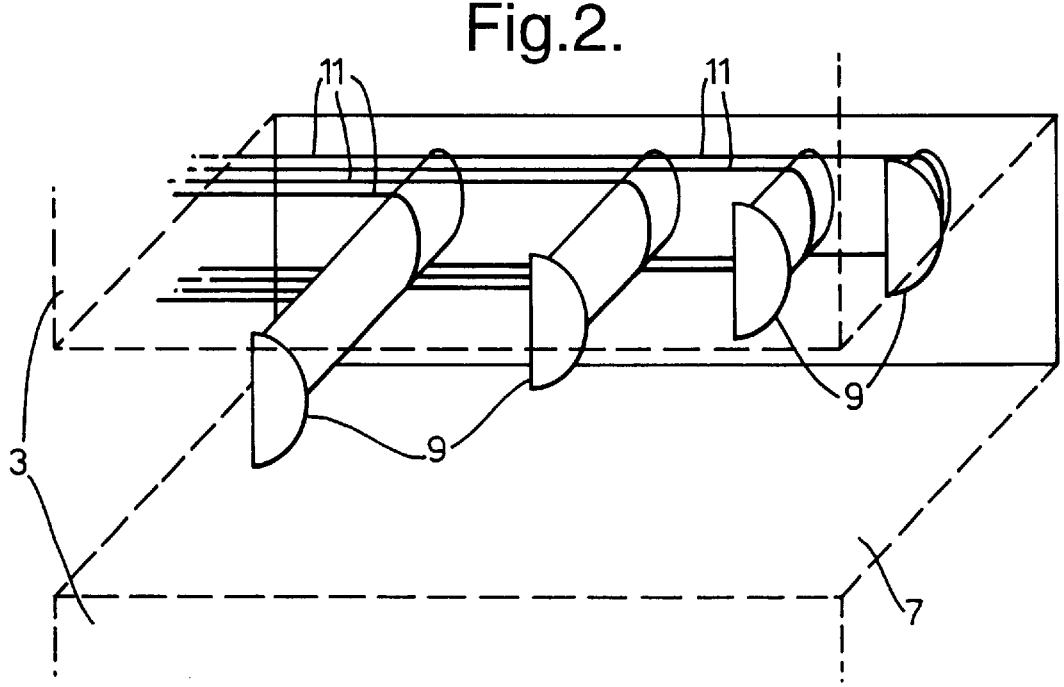
Figure 4:
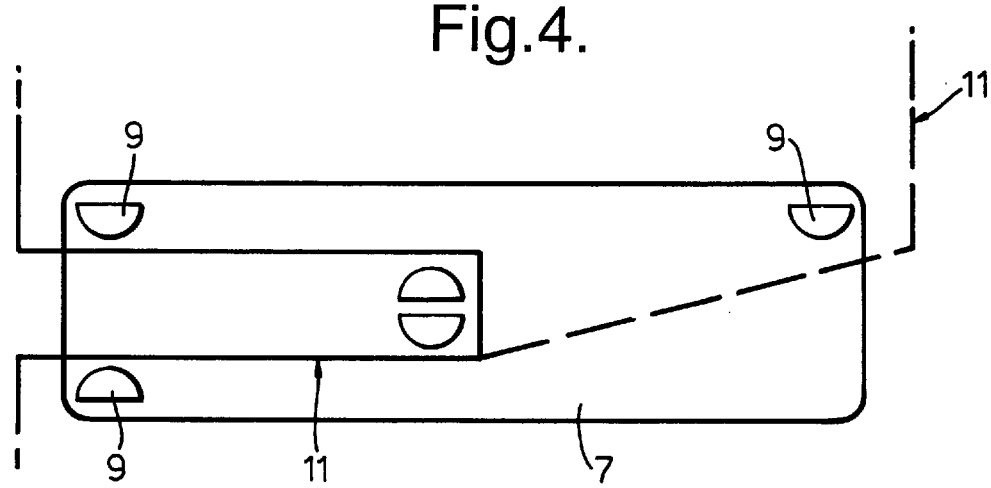

The invention will now be described, by way of example, with reference to the accompanying drawings, of which:

FIG. 1 illustrates, schematically, an optical fibre distribution system according to the invention;

FIG. 2 illustrates, schematically, an optical fibre storage region according to the invention; and FIG. 3 illustrates, schematically, how a spare length of optical fibre is stored in a storage region of a distribution system according to the invention; and FIG 4 illustrates, schematically, an alternative way of storing a length of optical fibre in another storage region of a distribution system according to the invention.

FIG. 1 illustrates, schematically, an optical fibre distribution system 1 according to the invention. The system comprises two stacks (other numbers of stacks are, of course, possible) of optical fibre interconnection modules 3, and ducting 5 around the stacks through which cables and/or fibres may be routed. In each stack is an optical fibre storage region 7. Illustrated schematically in each storage region 7 are a plurality of supports 9 which are mutually spaced-apart across the width of their respective stack. The storage region 7 illustrated in the left-hand stack (as drawn) has a single series of supports, whereas the storage region 7 illustrated in the right-hand stack has two series of supports. Ruggedized optical fibres 11 (e.g. pigtails) which extend between respective interconnection modules 3 are routed through the side ducts and into their respective storage region 7 through the closest side thereof. The optical fibres 3 are hooked around the appropriate support(s) 9 so that the spare or slack fibre is taken up.

FIG. 2 illustrates, schematically, an optical fibre storage region 7. The storage region 7 includes a series of elongate support members 9 extending from the back of the region in a direction substantially perpendicular to the width of the stack. The support members 9 are mutually spaced-apart across the width of the storage region, and each one is curved in cross-section so that an optical fibre 9 hooked around it is not bent at a radius below its normal operation minimum bend radius. The elongate support members decrease in length from the side of the storage region through which the fibres enter. This facilitates installation and removal of the fibres, particularly those fibres for which the greatest spare length is stored in the storage region.

FIG. 3 illustrates three steps in the connection of an optical fibre and the storage of a spare length thereof, in an optical fibre distribution system according to the invention. In step 1, opposite ends of an optical fibre 11 (e.g. a ruggedized optical fibre) are connected in two different interconnection modules (although they could be connected in the same interconnection module). This leaves a spare (slack) length 13 of the optical fibre which needs to be stored. In step 2 a middle portion of the optical fibre is bent and this bend 15 is inserted into an optical fibre storage region 7 which is situated in a stack of interconnection modules 3. In step 3 the bend 15 in the middle portion of the optical fibre is hooked over the front end of an appropriate support 9 which is selected from the series of available supports to provide the correct storage length required to take up that spare (slack) length of the optical fibre.

FIG. 4 illustrates, schematically, another storage region 7 of a distribution system according to the invention. In this storage region, there are supports 9 located in (some or all of) its corners. These corner supports may guide optical fibres 11 where they extend into the storage region. As shown in a dashed line, optical fibres may extend through the storage region from one side to the other, i.e. across the entire width of the storage region.

What is claimed is:

1. An optical fiber distribution system, comprising:
   (a) at least one stack of optical fiber interconnection modules; and
   (b) at least one optical fiber storage region located in at least one said stack of interconnection modules, which storage region, in use, stores spare lengths of one or more optical fibers which extend between respective interconnection modules, wherein the or each storage region comprises a plurality of stationary elongated supports which extend from a back of the at least one stack of optical interconnection modules towards a front of the at least one stack of optical interconnection modules and which are mutually spaced-apart across at least part of a width of the stack of interconnection modules such that, in use, each spare length of optical fiber is be routed into the storage region and routed around at least one of the elongated supports which is selected to provide at least approximately a correct storage length required for that spare length of optical fiber, wherein each of the plurality of elongated supports is longer than an adjacent one of the plurality of elongated supports from one side to an opposite side of the stack of interconnection modules.

2. A system according to claim 1, wherein said plurality of elongated supports comprises at least one series of elongated supports which are mutually spaced-apart across at least part of the width of the stack of interconnection modules.

3. A system according to claim 1, wherein each elongated support extends in a direction which is transverse to the width of the stack of interconnection modules.

4. A system according to claim 1, wherein the front and the back of the at least one stack of optical interconnection modules are transverse to its width, the front arranged to be readily accessible, and the back arranged to be less readily accessible, in use, and wherein the elongated supports are mounted on a structural member of the system located adjacent the back of the at least one stack of interconnection modules.

5. A system according to claim 4, wherein the elongated supports extend closer to the front of the stack of interconnection modules as their length increases from one side to the other side of the stack.

6. A system according to claim 4, wherein the or each optical fiber storage region comprises a module included in the at least one stack of interconnection modules; and wherein the structural member is part of the optical fiber storage region module.

7. A system according to claim 1, wherein the or each optical fiber storage region comprises a module included in the at least one stack of interconnection modules.

8. A system according to claim 7, wherein the or each storage region module has substantially same size and shape as the, or at least one of the, interconnection modules.

9. A system according to claim 4, wherein the structural member is a frame upon which the interconnection modules are mounted in use.

10. A system according to claim 1, wherein each elongated support is shaped so that a radius of curvature of an optical fiber routed around it in use cannot be less than a normal operational minimum bend radius of the fiber.

11. A system according to claim 1, wherein the or each optical fiber storage region has a side between the front and back of the at least one stack of optical interconnection modules for routing optical fibers into the optical fiber storage region.

12. A system according to claim 1, wherein the or each optical fiber storage region has at least one elongated support located at the point of entry/exit of an optical fiber into the storage region, the support being arranged so that an optical fiber entering/exiting the storage region is routed around it.

13. A system according to claim 1, further comprising one or more optical fibers, spare lengths of which are stored in at least one said optical fiber storage region.

14. A system according to claim 1, wherein the or each said optical fiber comprises a ruggedized optical fiber or group of fibers, a patch cord or a jumper.

15. A kit of parts for forming an optical fiber distribution system, comprising:
   (a) a plurality of optical fiber interconnection modules which, in use, are arranged in a stack; and
   (b) at least one optical fiber storage region module which, in use, is located in at least one side stack of interconnection modules, which storage region, in use stores spare lengths of one or more optical fibers which extend between respective interconnection modules, wherein the or each storage region comprises a plurality of stationary elongated supports which extend from a back of the at least one stack of optical interconnection modules towards a front of the at least one stack of optical interconnection modules and which are mutually spaced-apart across at least part of the width of the stack of interconnection modules such that, in use, each spare length of optical fiber is routed into the storage region and routed around at least one of the elongated supports which is selected to provide at least approximately the correct storage length required for that spare length of optical fiber, wherein each of the plurality of elongated supports is longer than an adjacent one of the plurality of elongated supports from one side to an opposite side of the stack of interconnection modules.

16. A kit of parts according to claim 15, wherein said plurality of elongated supports comprises at least one series of elongated supports which are to be mutually spaced-apart across at least part of the width of the stack of interconnection modules.

17. A kit of parts according to claim 15, wherein each elongated support extends in a direction which is transverse to the width of the stack of interconnection modules.

18. A kit of parts according to claim 15, wherein the front and the back of the at least one stack of optical interconnection modules are transverse to its width, the front to be arranged to be readily accessible, and the back to be arranged to be less readily accessible, in use, and wherein the supports are to be mounted on a structural member located adjacent the back of the stack of interconnection modules.

19. A kit of parts according to claim 18, wherein the elongated supports extend closer to the front of the stack of interconnection modules as their length increases from one side to the other side of the stack.

20. A kit of parts according to claim 18, wherein the or each optical fiber storage region comprises a module included in the at least one stack of interconnection modules; and wherein the structural member is part of the optical fiber storage region module.

21. A kit of parts according to claim 15, wherein the or each optical fiber storage region comprises a module included in the at least one stack of interconnection modules.

22. A kit of parts according to claim 21, wherein the or each storage region module has substantially same size and shape as the, or at least one of the, interconnection modules.

23. A kit of parts according to claim 18, wherein the structural member is a frame upon which the interconnection modules are mounted in use.

24. A kit of parts according to claim 15, wherein each elongated support is shaped so that a radius of curvature of an optical fiber routed around it in use cannot be less than a normal operational minimum bend radius of the fiber.

25. A kit of parts according to claim 15, wherein the or each optical fiber storage region has a side between the front and back of the at least one stack of optical interconnection modules for routing optical fibers into the optical fiber storage region.

26. A kit of parts according to claim 15, wherein the or each optical fiber storage region has at least one elongated support located at the point of entry/exit of an optical fiber into the storage region, the elongated support being arranged so that an optical fiber entering/exiting the storage region is to be routed around it.

27. A kit of parts according to claim 15, further comprising one or more optical fibers, spare lengths of which are stored in at least one said optical fiber storage region.

28. A kit of parts according to claim 15, wherein the or each said optical fiber comprises a ruggedized optical fiber or group of fibers, a patch cord or a jumper.

* * * * *